J. BAECHTOLD.
EMBROIDERED TRIMMINGS.
No. 185,207. Patented Dec. 12, 1876.
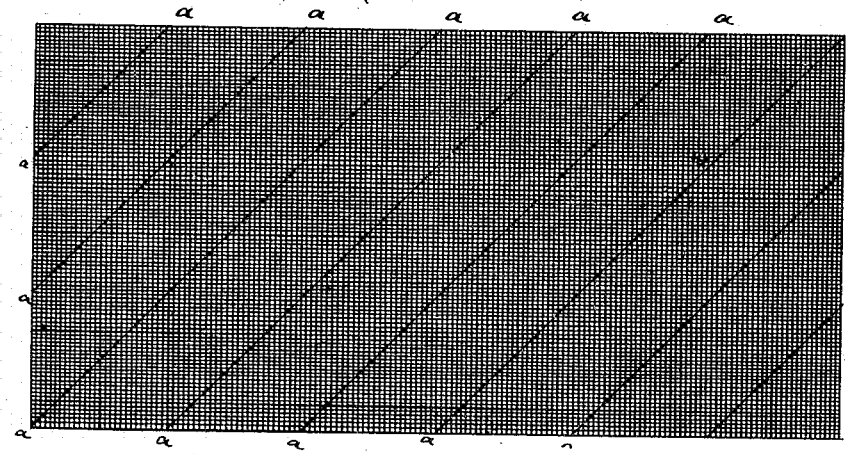
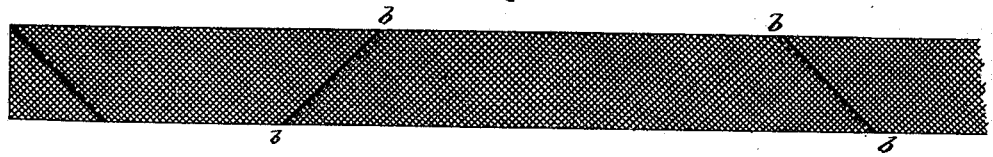
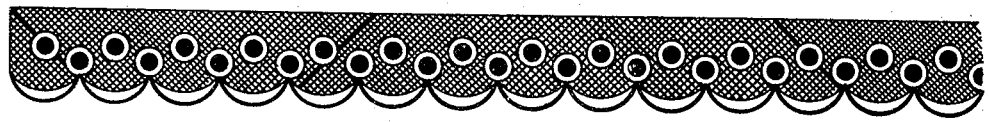
Witnesses:
A. v. Briesen
A. Moraga
Inventor:
Julius Baechtold
by his attorney
A. v. Briesen

UNITED STATES PATENT OFFICE.

JULIUS BAECHTOLD, OF HERISAN, SWITZERLAND.

IMPROVEMENT IN EMBROIDERED TRIMMINGS.

Specification forming part of Letters Patent No. 185,207, dated December 12, 1876; application filed October 20, 1876.

*To all whom it may concern:*

Be it known that I, JULIUS BAECHTOLD, of Herisan, Switzerland, have invented a new and useful Improvement in Embroidery, of which the following is a specification:

The object of this invention is to produce a continuous embroidery on a composite piece of fabric, such as linen, muslin, and the like, which is cut on a bias and composed of several strips sewed together. For this purpose I connect the different strips of the fabric to be embroidered before they are applied to the embroidery-machine, in contradistinction to first embroidering the separate strips and then connecting them, as was heretofore done.

In the drawing, Figure 1 represents a sheet or piece of woven fabric of the usual kind, which I prepare into strips for embroidering by cutting the sheet on a bias or diagonally, as shown by the lines $a\ a\ a$. The narrow strips thus produced are sewed together at the ends, as shown in Fig. 2, and form thus a continuous strip of suitable length, in which the threads of the fabric are diagonal to the length of the strip. This strip cannot be torn transversely, and is therefore stronger than a strip which is cut in the usual way, to wit, parallel with the warp or woof threads of the fabrics. The embroidery extends through and covers the short seams $b\ b$ that connect the several pieces of the strip, as shown in Fig. 3, which seams, owing to their diagonal direction and shortness, are almost imperceptible, and therefore not objectionable.

Embroidering-machines are well-known, and their use on a strip of my construction does not vary from their use on fabrics, as heretofore applied. The strip shown in Fig. 2 is made as long as the embroidering-machine requires, and of suitable width sometimes to make one, sometimes two, three, or more rows of embroidery thereon.

I claim as my invention—

1. The mode of manufacturing an embroidered trimming, herein described—that is, by uniting bias pieces at their inclined edges, and then embroidering the composite piece with a pattern extending lengthwise of the strip and across the seams, as and for the purpose set forth.

2. As a new article of manufacture, an embroidery-trimming, consisting of a composite-strip of bias sections of fabric united at their inclined edges, and having an embroidered pattern extending between and across the seams, as set forth.

JULIUS BAECHTOLD.

Witnesses:
F. V. BRIESEN,
LORING WATSON.